(12) United States Patent
Collot et al.

(10) Patent No.: US 6,817,240 B2
(45) Date of Patent: Nov. 16, 2004

(54) AIRCRAFT PROBE FOR MEASURING TOTAL TEMPERATURE AND PRESSURE

(75) Inventors: Lionel Collot, Vendome (FR); Joël Choisnet, Naveil (FR)

(73) Assignee: Thales Avionics S.A., Belizy Villacoublay (FR)

( * ) Notice: Subject to any disclaimer, the term of this patent is extended or adjusted under 35 U.S.C. 154(b) by 0 days.

(21) Appl. No.: 10/148,875

(22) PCT Filed: Dec. 12, 2000

(86) PCT No.: PCT/FR00/03489

§ 371 (c)(1),
(2), (4) Date: Jun. 11, 2002

(87) PCT Pub. No.: WO01/44821

PCT Pub. Date: Jun. 21, 2001

(65) Prior Publication Data

US 2003/0051546 A1 Mar. 20, 2003

(30) Foreign Application Priority Data

Dec. 17, 1999 (FR) .......................................... 99 15998

(51) Int. Cl.[7] ........................... A63B 53/00; G01P 13/00
(52) U.S. Cl. ................................................. 73/170.02
(58) Field of Search .......................... 73/170.02, 178 R, 73/180, 182, 189; 374/138

(56) References Cited

U.S. PATENT DOCUMENTS

| | | | |
|---|---|---|---|
| 4,121,088 A | * 10/1978 | Doremus et al. | ............ 219/201 |
| 4,672,846 A | 6/1987 | Cabot et al. | ................... 73/189 |
| 4,797,603 A | 1/1989 | Choisnet | |
| 4,972,725 A | 11/1990 | Choisnet | |
| 5,010,775 A | 4/1991 | Choisnet | |
| 5,025,661 A | * 6/1991 | McCormack | ................. 73/180 |
| 5,115,996 A | * 5/1992 | Moller | ....................... 244/12.5 |
| 5,257,536 A | * 11/1993 | Beigbeder et al. | ............. 73/180 |
| 5,406,839 A | 4/1995 | Leblond et al. | |
| 6,091,335 A | 7/2000 | Breda et al. | |
| 6,490,510 B1 | * 12/2002 | Choisnet | ...................... 701/14 |

FOREIGN PATENT DOCUMENTS

WO          95 08122          3/1995

* cited by examiner

*Primary Examiner*—William Oen
(74) *Attorney, Agent, or Firm*—Oblon, Spivak, McClelland, Maier & Neustadt, P.C.

(57) ABSTRACT

A probe for an aircraft, making it possible in particular to measure the total temperature of the air flow surrounding the aircraft. The probe includes a moving vane configured to orientate itself in the axis of an air flow surrounding the moving vane and, fixed to the moving vane, a device for measuring the total temperature of the air flow.

14 Claims, 1 Drawing Sheet

AIRCRAFT PROBE FOR MEASURING TOTAL TEMPERATURE AND PRESSURE

Figure 1:
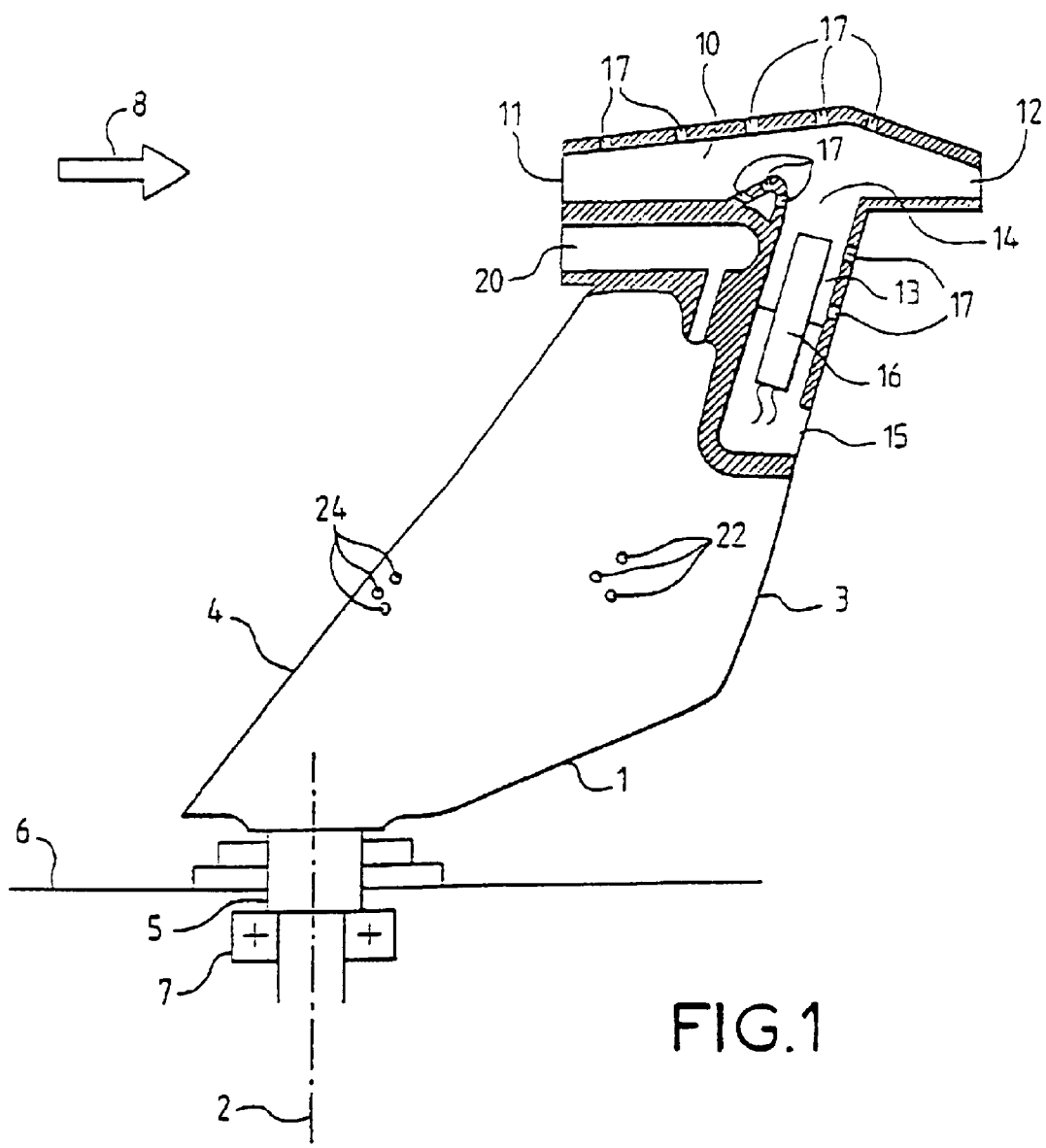

The subject of the invention is a probe for an aircraft, making it possible in particular to measure the total temperature of the air flow surrounding the aircraft.

Measuring the total temperature is useful for determining the actual speed of the aircraft. What happens is that other sensors belonging to the aircraft are able to measure the total pressure Pt and the static pressure Ps of the aircraft. Knowledge of these two pressures Pt and Ps make it possible to determine the Mach number M of the aircraft, using the following formula:

$$M = \sqrt{5\left[\left(\frac{Pt}{Ps}\right)^{2/7} - 1\right]} \quad (1)$$

Incidentally, the Mach number M represents the ratio between the actual speed of the aircraft and the speed of sound. Now, the speed of sound, Vs, depends on the temperature, Ts, of the air surrounding the aircraft.

$$Vs = \sqrt{\gamma \cdot r \cdot Ts} \quad (2)$$

where γ is a constant close to 1.4 r is the perfect gas constant

Ts is the static temperature of the air, expressed in Kelvin.

The static temperature Ts is the temperature of the air at zero speed. This temperature is very difficult to measure on board an aircraft. It would be necessary to place a temperature sensor placed at the bottom of a hole more or less perpendicular to the skin of the aircraft in a region where the skin is more or less parallel to the air flow. This temperature sensor would in particular be disrupted by the skin temperature which would carry the risk of affecting the static temperature measurement. It is therefore preferable to measure the total temperature Tt of the air flow by placing the temperature sensor in the air flow. The static temperature Ts can then be determined using equation (3)

$$Tt = (1 + 0.2 \, M^2) Ts \quad (3)$$

All this makes it possible to determine the actual speed of the aircraft as a function of the total temperature Tt, the total pressure Pt and the static pressure Ps of the air flow surrounding the aircraft.

Total temperature measurement probes fixed to the skin of the aircraft are known. These probes plan for part of the air flow surrounding the aircraft to sweep over a temperature sensor. When the angle of incidence of the aircraft with respect to the air flow surrounding it is changed, the proportion of the air flow that sweeps over the temperature sensor is disrupted and this affects the total temperature measurement Tt. All this becomes increasingly important since it is when the aircraft is at a high angle of incidence that its speed needs to be known with precision.

The object of the invention is to improve the precision with which the total temperature Tt can be measured particularly when the angle of incidence of the aircraft with respect to the air flow surrounding it is high.

To achieve this objective, the subject of the invention is a probe for an aircraft, characterized in that it comprises a moving vane intended to orientate itself in the axis of an air flow surrounding the moving vane and, fixed to the moving vane, means for measuring the total temperature of the air flow.

In a particular embodiment of the invention, the following are grouped together in one and the same probe and fixed to a moving vane of the probe:

means for measuring the total temperature of the air flow;

means for measuring the total pressure of the air flow;

means for measuring the static pressure of the air flow;

means for measuring the angle of incidence of the aircraft.

Grouping these various measurement means together makes it possible to determine in a complete way the modulus and the direction of the aircraft velocity vector using a single probe. This grouping-together also makes it possible to reduce the number of openings made in the skin of the aircraft.

The invention will be better understood and other advantages will become apparent from reading the description of a particular embodiment of the invention, which embodiment is illustrated by the attached drawing in which:

FIG. 1 depicts a probe comprising:

means for measuring the total temperature of the air flow;

means for measuring the total pressure of the air flow;

means for measuring the static pressure of the air flow;

means for measuring the angle of incidence of the aircraft.

The probe depicted in FIG. 1 comprises a moving vane 1 able to rotate about an axis 2. The vane 1 comprises an aerofoil 3 having a plane of symmetry, parallel to the plane of the figure and separating the pressure face side from the suction face side. The profile of the aerofoil 3 at right angles to its leading edge 4 is, for example, of the NACA 00ZT type. In the example depicted, the leading edge 4 is more or less straight and is inclined with respect to the axis 2. It must be clearly understood that other aerofoil shapes could be used in order to implement the invention. The vane 1 also comprises a shaft 5 of axis 2 which penetrates the skin 6 of an aircraft. The shaft 5 is able to turn with respect to the aircraft, for example by means of a rolling bearing 7.

Because of the shape of the aerofoil 3, the vane 1 naturally orientates itself in the axis of the air flow surrounding the moving vane 1. The axis of the flow is embodied by the arrow 8 depicted in FIG. 1.

The moving vane 1 further comprises means for measuring the total temperature of the air flow.

Advantageously, these means comprise two channels including a first channel 10 comprising an inlet orifice 11 more or less facing the air flow of axis 8 when the moving vane 1 is oriented along the axis 8 of the air flow. The first channel 10 also comprises an outlet orifice 12 allowing air in the first channel 10 to escape in the direction of the axis 8. Particles likely to be circulating in the first channel 10 escape without coming into contact with a temperature sensor the position of which will be described later. These particles consist, for example, of water droplets or dust.

The second channel 13 comprising means for measuring the total temperature of the air flow comprises an inlet orifice 14 opening into the first channel 10. The second channel 13 is, for example, more or less perpendicular to the first channel 10. Some of the air circulating in the first channel 10 enters the second channel 13 via the inlet orifice 14 and escapes from the second channel 13 via an outlet orifice 15 which opens to the outside toward the rear of the moving vane 1.

The means for measuring the total temperature of the air flow furthermore comprise a temperature sensor 16 situated inside the second channel 13. The temperature sensor 16 comprises, for example, a wound platinum-based wire forming an electric resistor the resistance of which varies according to its temperature. The temperature sensor 16 is fixed in the second channel 13 in such a way as to avoid as far as possible any transfers of heat between the structure of the second channel 13 and the temperature sensor 16.

The two channels 10 and 13 are arranged in such a way that air from the flow of axis 8 circulates in the second channel 13 at low speed. This speed needs to be very much lower than the speed of sound in the flow while at the same time being non-zero so as to prevent the temperature sensor 16 from taking the temperature of the structure of the moving vane 1 and, in particular, the temperature of the structure of the two channels 10 and 13.

What actually happens is that when the aircraft is flying at high altitude, the temperature of the air flow may be well below zero degrees Celsius, and this leads to a risk of ice forming on the moving vane 1. The ice may in particular block these channels 10 and 13 and thus prevent any correct temperature measurement.

To avoid the formation of ice, the moving vane 1 comprises deicing means comprising, for example, a heating electric resistor arranged in the structure of the vane. These deicing means heat up the moving vane 1 and therefore the air which circulates in the two channels 10 and 13. To prevent the heating-up of the air disrupting the temperature measurement, orifices 17 for bleeding off the boundary layer of the air circulating in the two channels 10 and 13 are provided.

Advantageously, the probe further comprises means for measuring the total pressure and the static pressure of the air flow and the angle of incidence of the aircraft.

The means for measuring the total pressure comprise, for example, a total pressure tapping Pt comprising a third channel 20 opening, like the first channel 10, via an orifice 21 more or less facing the air flow of axis 8. This third channel 20 is better known by the name of Pitot tube.

The means for measuring the static pressure Ps comprise, for example, two static pressure tappings 22 and 23, each situated on one of the faces of the moving vane 1. In FIG. 1 only the pressure tapping 22 is visible. The pressure tapping 23 is placed on the non-visible face of the moving vane 1, more or less symmetrically with the pressure tapping 22 with respect to the plane of symmetry of the aerofoil 3. This plane of symmetry is parallel to the plane of FIG. 1. Each pressure tapping 22 and 23 may comprise several orifices, three are depicted in FIG. 1 so as, in particular, to limit the cross section of each orifice in order to cause less disruption to the flow of air surrounding the moving vane 1 or alternatively so as to be able to measure pressure even if one of the orifices becomes blocked. The two static pressure tappings 22 and 23 are in communication with a chamber situated inside the vane so as to average out the pressure between the two tappings 22 and 23.

The means for measuring the angle of incidence of the aircraft comprise, for example, two incidence pressure tappings 24 and 25 situated, as was the case with the static pressure tappings 22 and 23, on one of the faces of the vane also more or less symmetrically with respect to the plane of symmetry of the aerofoil 3. The incidence pressure tappings 24 and 25 are not in communication, and it is the difference between the pressures between each tapping 24 and 25 that makes it possible to determine the exact angle of incidence of the moving vane 1 and thus that of the aircraft. In order to improve the sensitivity of the incidence measurement, the pressure tappings 24 and 25 can be placed in the immediate vicinity of the leading edge 4 of the moving vane 1.

The use of the information originating from the various total, static and incidence pressure tappings is, for example, described in French patent FR 2 665 539 filed on Aug. 3, 1990 in the name of the applicant company.

That patent describes in particular the feedback control of the angular position of the moving vane 1 about its axis 2 so that the aerofoil 3 of the moving vane 1 is best aligned with the axis 8 of the air flow. The orientation, thus improved, of the moving vane 1 makes it possible, in particular, to have even better control over the circulation of the streams of air in the channels 10 and 13.

What is claimed is:

1. A probe for an aircraft, comprising:
   a moving vane configured to orientate itself in an axis of an air flow surrounding the moving vane; and
   means, fixed to the moving vane, for measuring a total temperature of the air flow,
   wherein the means for measuring the total temperature comprises:
   a first channel comprising an air inlet orifice substantially facing the air flow and an air outlet orifice;
   a second channel having an air inlet situated in the first channel; and
   a temperature sensor fixed in the second channel.

2. The probe as claimed in claim 1, wherein the second channel is substantially perpendicular to the first channel.

3. The probe as claimed in claim 1, wherein the first and second channels comprise a plurality of orifices allowing a boundary layer of air flowing through the channels to be bled off toward an outside of the probe.

4. The probe as claimed in claim 2, wherein the first and second channels comprise a plurality of orifices allowing a boundary layer of air flowing through the channels to be bled off toward an outside of the probe.

5. The probe as claimed in claim 1, further comprising, fixed to the moving vane:
   means for measuring a total pressure of the air flow;
   means for measuring a static pressure of the air flow; and
   means for measuring an angle of incidence of the aircraft.

6. The probe as claimed in claim 1, further comprising, fixed to the moving vane:
   means for measuring a total pressure of the air flow;
   means for measuring a static pressure of the air flow; and
   means for measuring an angle of incidence of the aircraft.

7. The probe as claimed in claim 2, further comprising, fixed to the moving vane:
   means for measuring a total pressure of the air flow;
   means for measuring a static pressure of the air flow; and
   means for measuring an angle of incidence of the aircraft.

8. The probe as claimed in claim 3, further comprising, fixed to the moving vane:
   means for measuring a total pressure of the air flow;
   means for measuring a static pressure of the air flow; and
   means for measuring an angle of incidence of the aircraft.

9. The probe as claimed in claim 4, further comprising, fixed to the moving vane:
   means for measuring a total pressure of the air flow;
   means for measuring a static pressure of the air flow; and
   means for measuring an angle of incidence of the aircraft.

10. The probe as claimed in claim 5, wherein the means for measuring the angle of incidence of the aircraft comprises two incidence pressure tappings each situated on one of faces of the moving vane substantially symmetrically with respect to a plane of symmetry of the moving vane, and wherein an orientation of the moving vane with respect to a direction of the air flow is feedback controlled with pressures recorded at the two incidence pressure tappings being made substantially equal.

11. The probe as claimed in claim 6, wherein the means for measuring the angle of incidence of the aircraft comprises two incidence pressure tappings each situated on one of faces of the moving vane substantially symmetrically with respect to a plane of symmetry of the moving vane, and wherein an orientation of the moving vane with respect to a direction of the air flow is feedback controlled with pressures recorded at the two incidence pressure tappings being made substantially equal.

12. The probe as claimed in claim 7, wherein the means for measuring the angle of incidence of the aircraft comprises two incidence pressure tappings each situated on one of faces of the moving vane substantially symmetrically with respect to a plane of symmetry of the moving vane, and wherein an orientation of the moving vane with respect to a direction of the air flow is feedback controlled with pressures recorded at the two incidence pressure tappings being made substantially equal.

13. The probe as claimed in claim 8, wherein the means for measuring the angle of incidence of the aircraft comprises two incidence pressure tappings each situated on one of faces of the moving vane substantially symmetrically with respect to a plane of symmetry of the moving vane, and wherein an orientation of the moving vane with respect to a direction of the air flow is feedback controlled with pressures recorded at the two incidence pressure tappings being made substantially equal.

14. The probe as claimed in claim 9, wherein the means for measuring the angle of incidence of the aircraft comprises two incidence pressure tappings each situated on one of faces of the moving vane substantially symmetrically with respect to a plane of symmetry of the moving vane, and wherein an orientation of the moving vane with respect to a direction of the air flow is feedback controlled with pressures recorded at the two incidence pressure tappings being made substantially equal.

* * * * *

UNITED STATES PATENT AND TRADEMARK OFFICE
CERTIFICATE OF CORRECTION

PATENT NO. : 6,817,240 B2
DATED : November 16, 2004
INVENTOR(S) : Collot et al.

It is certified that error appears in the above-identified patent and that said Letters Patent is hereby corrected as shown below:

Title page,
Item [73], Assignee, should read
-- [73]  Assignee:  Thales Avionics S.A., Velizy Villacoublay, (FR) --

Signed and Sealed this

Eighth Day of February, 2005

JON W. DUDAS
*Director of the United States Patent and Trademark Office*